United States Patent [19]
Boenig et al.

[11] 4,348,630
[45] Sep. 7, 1982

[54] SUPERCONDUCTING VAR CONTROL

[75] Inventors: Heinrich J. Boenig, Los Alamos, N. Mex.; William V. Hassenzahl, Piedmont, Calif.

[73] Assignee: The United States of America as represented by the United States Department of Energy, Washington, D.C.

[21] Appl. No.: 213,275

[22] Filed: Dec. 5, 1980

[51] Int. Cl.³ .............................................. G05F 1/70
[52] U.S. Cl. .................................... 323/207; 323/360
[58] Field of Search .............................. 323/205–208, 323/360; 363/43

[56] References Cited

U.S. PATENT DOCUMENTS 4,122,512 10/1978 Peterson et al. ...................... 363/14

OTHER PUBLICATIONS

General Electric SCR Manual, 4th Ed., 1967, p. 180.
Hassenzahl, William V., "Will Superconducting Magnetic Energy Storage be used on Electric Utility Systems," *IEEE Transactions on Magnetics*, vol. MAG-11, No. 2, Mar. 1975.
Hassenzahl et al., "Magnetic Energy Storage and its Application in Electric Power Systems," *IEEE International Conference Technical Papers*, Mar. 27, 1973, pp. 1–13.
R. W. Boom et al., "Superconductive Energy Storage for Power Systems", *Intermag Conference*, Kyoto, Japan, Apr. 13, 1972.

*Primary Examiner*—William M. Shoop
*Attorney, Agent, or Firm*—Jerome B. Rockwood; Paul B. Gaetjens; Richard G. Besha

[57] ABSTRACT

Static VAR control means employing an asymmetrically controlled Graetz bridge and a superconducting direct current coil having low losses and low cost characteristics.

7 Claims, 8 Drawing Figures

SUPERCONDUCTING VAR CONTROL

BACKGROUND OF THE INVENTION

The present invention relates to a static VAR control system and more particularly to a static VAR control system employing an asymmetrically-controlled Graetz bridge in connection with a superconducting dc coil.

Thyristor phase controlled reactors with a parallel connected capacitor bank are now used as static VAR systems to compensate for lagging load currents and to eliminate unbalanced loading of the three-phase ac system. In general, a static shunt compensator consists of three air core reactors arranged in a delta configuration and connected to a pair of antiparallel thyristors, or silicon controlled rectifiers. A three-phase capacitor bank provides a constant leading power factor. Reactor currents can be varied continuously from zero to the maximum value by proper phase control of the thyristor switches. It is known that compensators with power ratings of 20 to 100 MVAR connected to a 13.8 or 34.5 kV bus typically have 1.2% losses. These losses can be broken down into 0.15% capacitor losses, 0.6% reactor losses, and 0.45% SCR losses. In a 40 MVAR conventional static VAR control system, the total losses will amount to 480 kV.

It is well known that low frequency and dc cryogenic coils generate low losses. Therefore, a static VAR control system employing superconducting magnets is more economical than the above conventional systems. Further, VAR control requires dc superconducting coils because losses in ac superconducting coils would be too high. Thus, a direct replacement of room temperature coils by superconducting coils would not result in a system with lower losses.

A six or twelve-pulse symmetrically-controlled Graetz bridge together with a room temperature or superconducting dc magnet is suitable for VAR control. However, such a system will have high losses when the reactive power is changed quickly because the coil current also changes quickly. A superconducting VAR control system, consisting of an asymmetrically-controlled bridge and a superconducting reactor, will have low system losses because the current in the coil may be held essentially constant. The asymmetrically-controlled six-pulse bridge produces a 360 Hz harmonic in the coil and 300 and 420 Hz line current harmonics. The superconducting coil must be designed to have acceptably low losses at this frequency.

A conventional six-pulse Graetz circuit allows the use of a dc magnet for VAR control. In an ideal six-pulse bridge, only reactive power is absorbed for a phase angle delay of 90°. Continuous VAR control is achieved by varying the phase delay angle for a few milliseconds, thereby changing the reactor current. Once the reactor current has reached this new value, the phase delay angle is reset to 90°. During the change from one VAR value to another, real power is absorbed or fed back. If this circuit is used to compensate for fast VAR changes, the fast real power change may be an undesirable feature. A superconducting coil in this scheme would have considerable losses because of the high di/dt.

Two six-pulse Graetz bridges connected in series with a 30% phase shift between their three-phase systems result in a twelve-pulse bridge. If the commutation reactances are neglected, such a twelve-pulse bridge would be well suited for continuous VAR control by operating one six-pulse bridge in the rectifier mode and the other in the inverter mode. The individual bridge voltages are controlled in such a way that the average voltage output is zero once the coil is charged. Continuous VAR control from its maximum value to zero is achieved with the real power always identical to zero. However, the commutation reactance can not be neglected. The reactive power can only be varied continuously by about 30% without changing the coil current and coil power. If a greater VAR change is required, the average coil current must be changed, thereby causing a real power change. The twelve-pulse circuit requires a converter transformer and reduces the harmonic output of the line current compared to the six-pulse circuit. While such systems have been successfully employed, they do not easily allow for individual phase control. As in the six-pulse circuit, the superconducting coil would be subjected to fast current changes and thus would exhibit high losses when the system is installed to control fast changing VAR demands. Such prior art bridges are disclosed in W. Farrer et al., "Fully Controlled Regenerative Bridges with Half-Controlled Characteristics," Proc. Inst. Electr. Eng., 125, 2, pp. 109–112 (February 1978) and in Z. Zabar L., "Bypass Operation by Cyclic Firing of the Bridge Thyristors," Proc. Inst. Electr. Eng., 126, 9, pp 833–836 (September 1979).

SUMMARY OF THE INVENTION

To enable utilization of the low loss superconducting reactor, it is necessary to enable VAR control with very little change in the current through the superconductor. In conventional six and twelve-pulse Graetz bridges, the superconducting coil would be subjected to fast current changes, and thus would exhibit high losses when the system is installed to control fast changing VAR demands. The conduction sequence of the thyristors and six and twelve-pulse bridges can be modified to obtain a line current that is 90° out of phase with respect to the line voltage and whose fundamental amplitude can be varied from zero to its maximum value without changing the coil current. In a single-phase system, a free wheeling silicon controlled rectifier may be provided across the superconducting coil. If initially the coil is charged to its maximum current, and when the phase delay angle is changed to 90°, the system absorbs reactive power at its maximum rate. To decrease the line current to zero, and therefore the reactive power, the coil current must free-wheel through the silicon controlled rectifier during part of the cycle. This is possible because the converter voltage is negative twice each cycle for a quarter of a period. During that time, the free-wheeling silicon controlled rectifier is forward biased. The line current assumes the shape of pulse width regulated current and can be reduced continuously from its maximum value to a small minimum value, whereas the coil current stays constant. The line current is always 90° out of phase with respect to the line voltage, so the circuit absorbs only reactive power, with an amplitude proportional to the line current.

As is known to those skilled in the art, super-conductivity is a phenomenon exhibited by certain materials at very low temperatures. As a result, these materials become virtually resistanceless. These resistanceless materials can carry a constant current and have no heating or other losses. While the current or magnetic field in these substances is changing, however, they exhibit a resistive characteristic. Any losses result in heat, and the heat associated with ac resistance must be removed at a low temperature, typically about 4 K. Because of inherent thermodynamic effects and the various process inefficiencies, nearly 1000 W of room-temperature power are required to remove 1 W at 4 K. For this reason it is necessary to have extremely low losses in a superconducting coil. By enabling the use of a superconducting coil, the VAR control system of the present invention has lower overall losses while its cost and electrical characteristics are comparable to those of conventional systems.

It is therefore an object of this invention to provide a low loss VAR control system.

Another object of this invention is to provide means enabling employment of a superconducting inductance in a VAR control system.

Another object of the present invention is to provide a bridge rectifier circuit to obtain a line current 90° out of phase with respect to the line voltage.

Another object of this invention is to provide a line current in a three-phase bridge circuit that can be varied from a small minimum value to its maximum value without changing the coil current.

Additional objects, advantages, and novel features of the invention will be set forth in part in the description which follows, and will become apparent to those skilled in the art upon examination of the following, or may be learned by practice of the invention. The objects and advantages of the invention may be realized and obtained by means of the instrumentalities in combinations particularly pointed out in the appended claims. To achieve the foregoing and other objects and in accordance with the purpose of the present invention, as embodied and broadly described herein the VAR control of this invention may comprise an asymmetrical Graetz bridge employed in connection with a superconducting reactor coil.

DETAILED DESCRIPTION OF THE PREFERRED EMBODIMENT OF THE INVENTION

Figure 1:
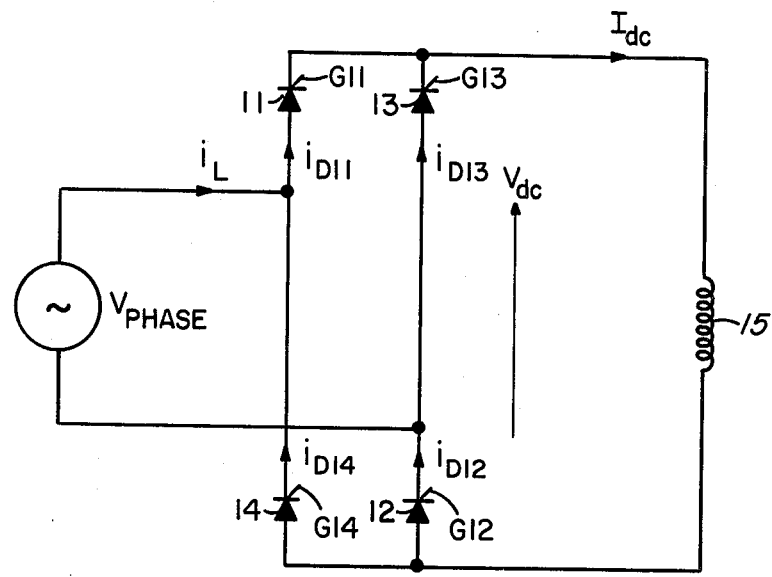
FIG. 1 illustrates a single-phase asymmetrically-controlled Graetz bridge.
Figure 2:
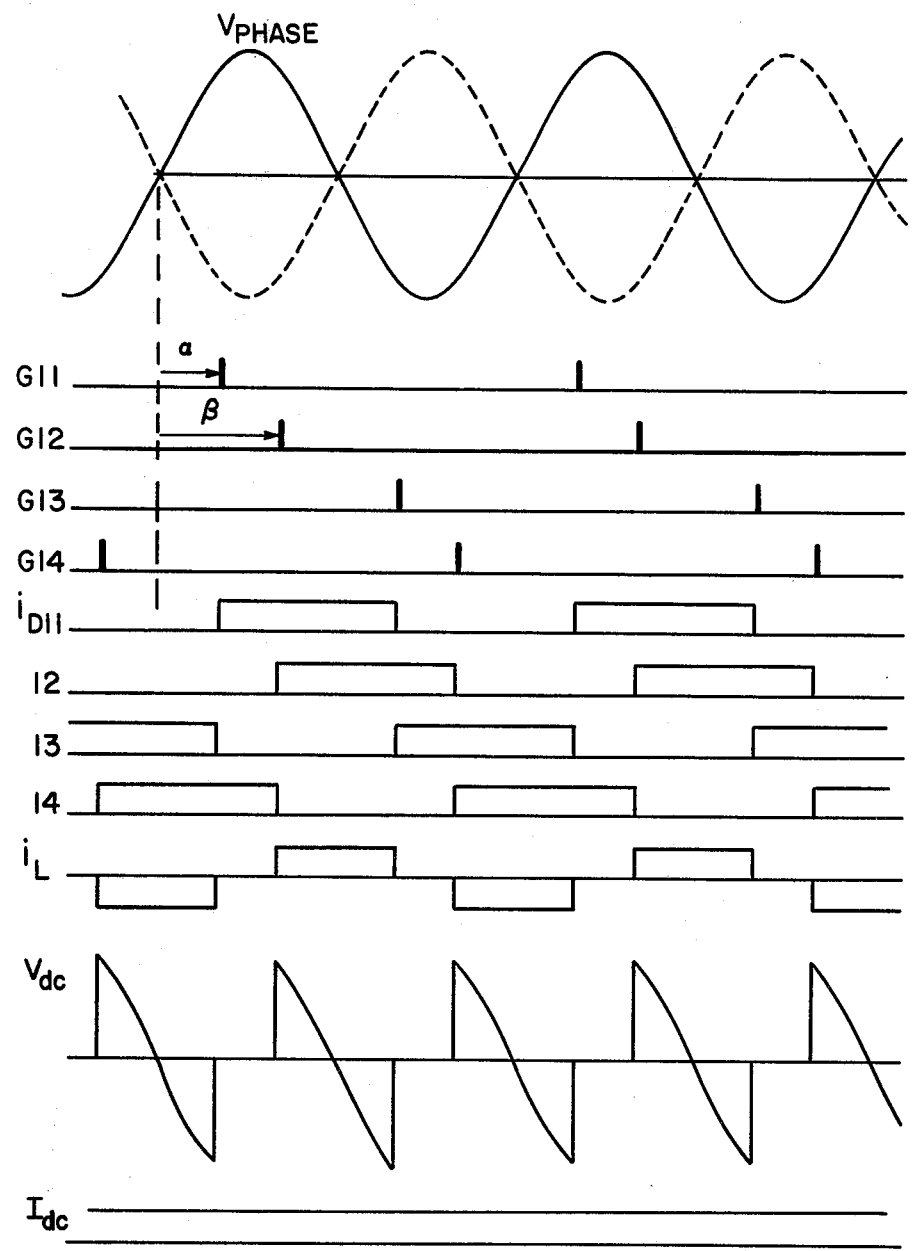
FIG. 2 is a waveform diagram illustrating the operation of the bridge of FIG. 1.

The asymmetrically-controlled single-phase bridge of FIG. 1, is considered in conjunction with the waveform diagram of FIG. 2. If initially, coil 15 is charged to its maximum current and then the phase delay angle is changed to 90°, the system absorbs reactive power at its maximum rate to decrease the line current $i_L$, and therefore, the reactive power to zero. The coil current freewheels through silicon controlled rectifiers 11 and 14, or 12 and 13, during parts of the cycle. This is possible because the converter voltage is negative twice each cycle for a quarter of a period. The silicon controlled rectifiers are forward biased.

FIG. 2 illustrates the line current $i_L$, the gate pulses G-11, G-12, G-13, and G-14 applied to the gate electrodes of silicon controlled rectifiers 11, 12, 13, 14. The current through the silicon controlled rectifiers are indicated by $i_{D11}$, $i_{D12}$, $i_{D13}$, and $i_{D14}$. The voltage across superconducting coil 15 is illustrated by waveform $V_{dc}$, while the coil current is illustrated as $I_{dc}$.

Figure 3:
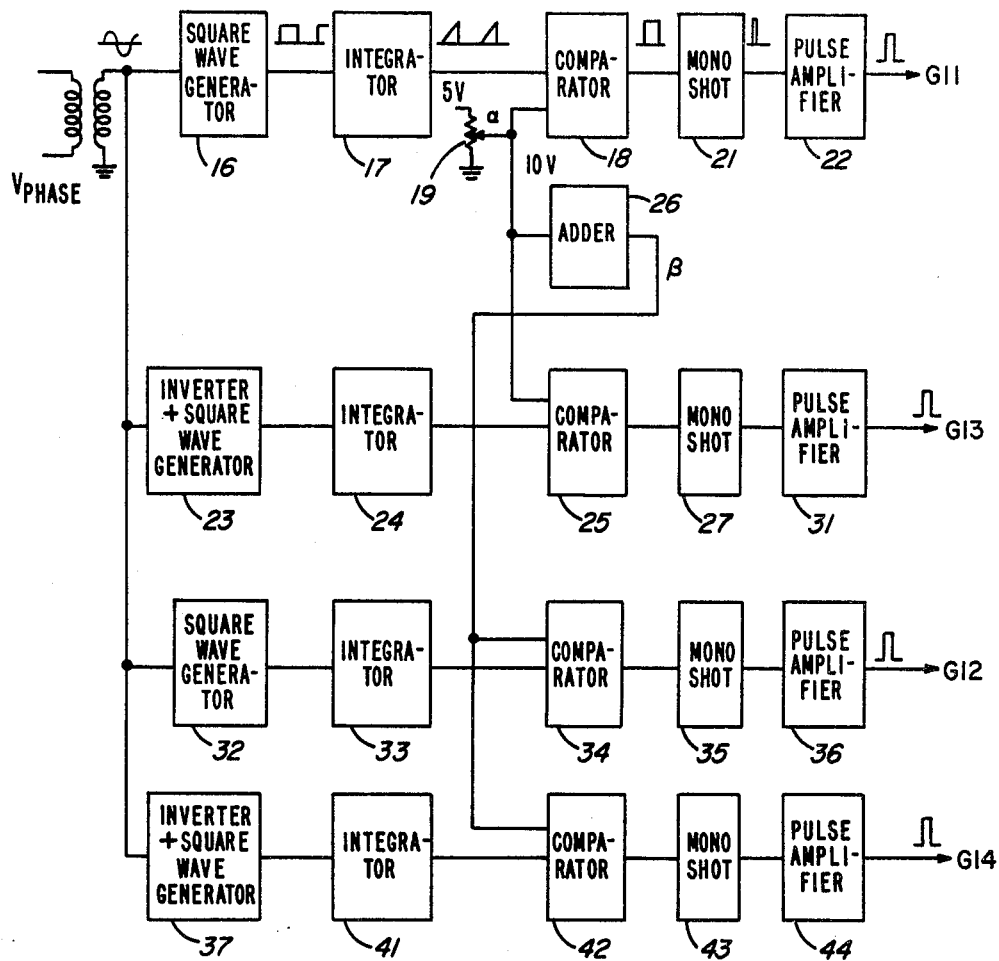
FIG. 3 is the circuit connected to the gates of the individual silicon controlled rectifiers making up the bridge of FIG. 1.

A circuit providing gate pulses to silicon controlled rectifiers 11, 12, 13, and 14 is illustrated in FIG. 3. The gate electrode g11 of silicon controlled rectifier 11 is energized at the proper time by a circuit comprising a square wave generator 16 connected to the single phase line, an integrator turning the square wave into a saw tooth wave, a comparator 18 generating a square wave in response to the integrated saw tooth wave and the direct voltage from potentiometer 19, a monoshot 21 and pulse amplifier 22. The inverter and square wave generator 23 is connected to a single phase line, generating a square wave of opposite phase from that generated by square wave generator 16. The square wave from inverter and square wave generator 23 is applied to integrator 24 and comparator 25, together with the voltage from potentiometer 19. The rectangular wave from comparator 25 is applied to monoshot 27 and pulse amplifier 31, and then to G-13. The square wave generator 32, integrator 33, comparator 34, monoshot 35, and pulse amplifier 36 are essentially similar to the components following square wave generator 16. Similarly, inverter and square wave generator 37, integrator 41, comparator 42, monoshot 43, and pulse amplifier 44 apply the control pulse to G-14. Comparators 34 and 42 are also connected to the output β from adder 26.

Comparing FIG. 3 with FIG. 2 it will be apparent that gates g11 and g13 are actuated by pulses delayed from the zero crossing by a time α, while gates g12 and g14 are delayed a time β. As will be further apparent, the currents $i_{d11}$ and $i_{d13}$ alternate, while $i_{d12}$ and $i_{d14}$ alternate. As a result of the current overlaps, $I_{dc}$, through inductor 15 remains constant.

Figure 4:
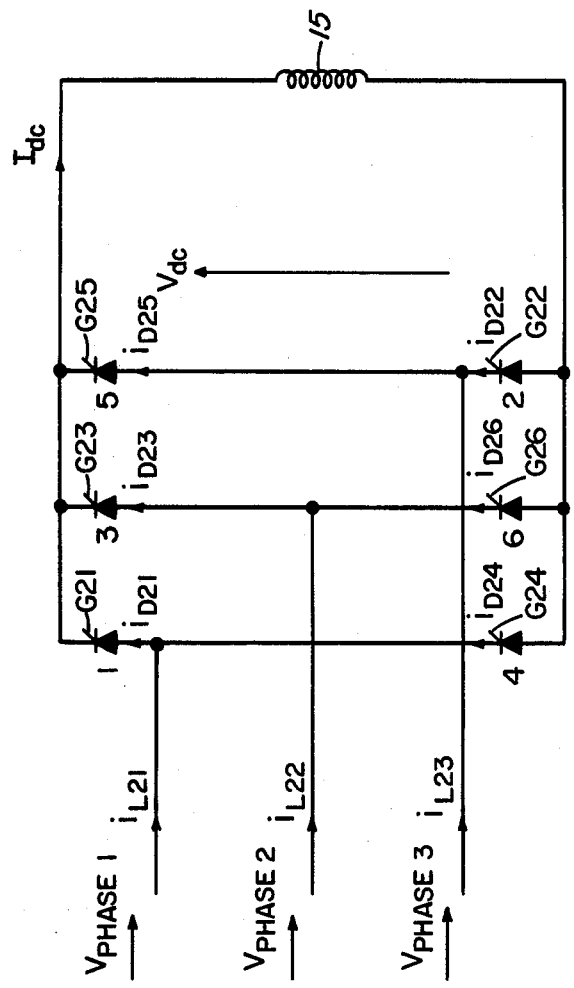
FIG. 4 illustrates a three-phase asymmetrically-controlled Graetz bridge.
Figure 5:
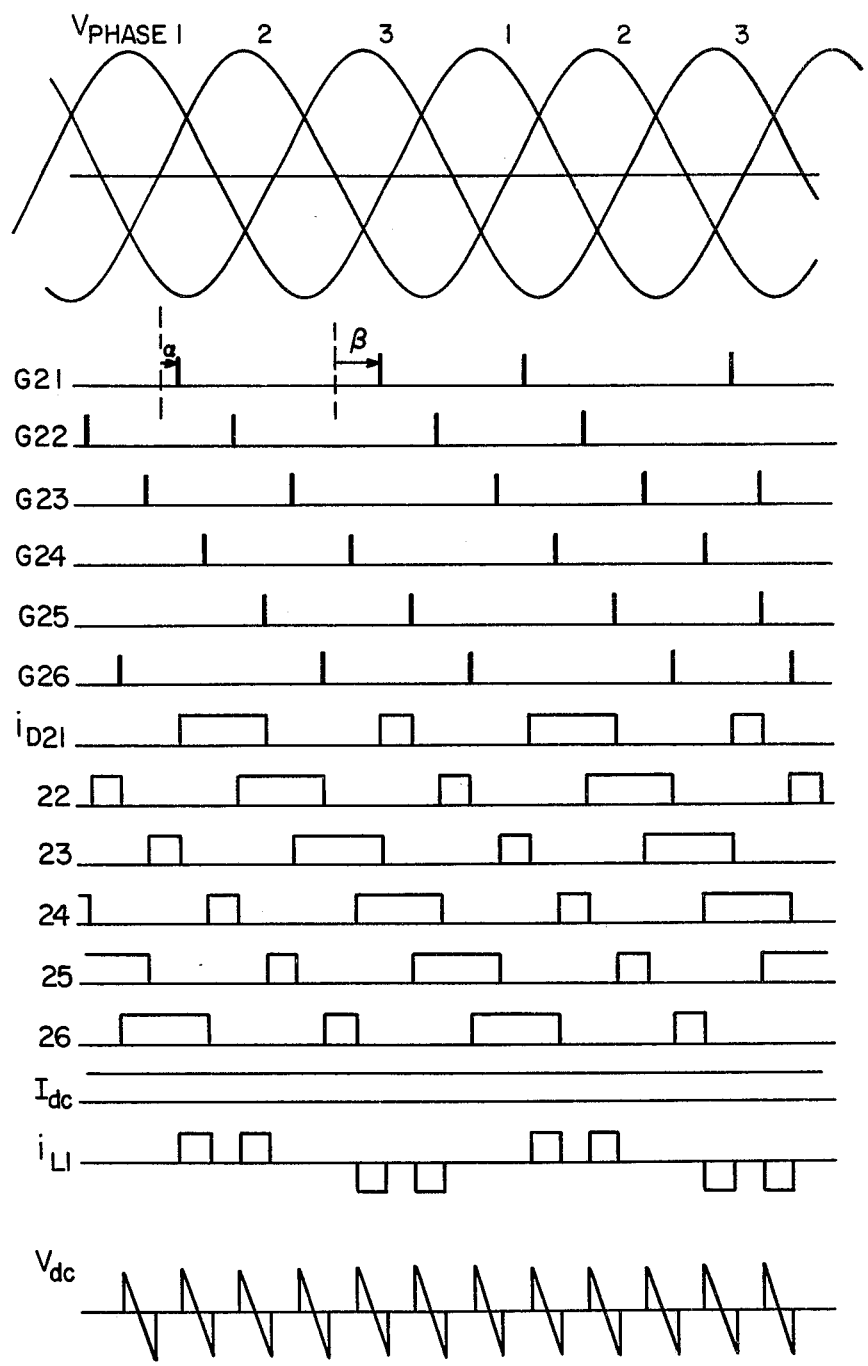
FIG. 5 is a waveform diagram illustrating the operation of the bridge of FIG. 4.
Figure 6:
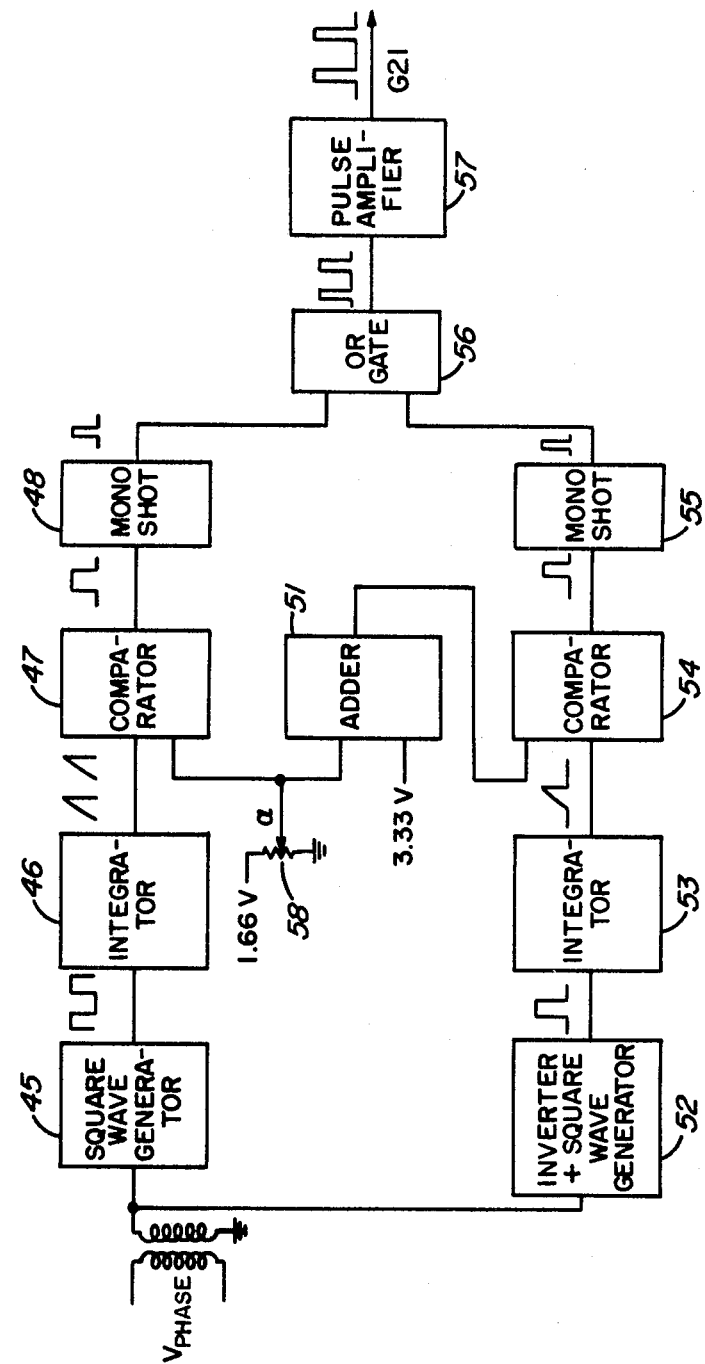
FIG. 6 illustrates a circuit connected to and controlling one of the silicon controlled rectifiers forming part of the bridge illustrated in FIG. 4.

FIG. 4, taken in conjunction with FIG. 5 and FIG. 6, illustrate a three phase version of the circuit comprising a portion of the present invention. The pulses actuating gate current $i_{D21}$ are illustrated on the appropriate line of FIG. 5. As in the single phase version, illustrated in FIG. 2, the three phase version varies the voltage $V_{dc}$, while the current $I_{dc}$ through inductor 15 remains constant. The circuit controlling gate electrode 21 is illustrated in FIG. 6. Square wave generator 45 is connected to one of three phases. The square wave is integrated by integrator 46, the resulting saw tooth wave being applied to comparator 7, wherein it is compared with the voltage from potentiometer 58. The square wave output of comparator 47 is then applied to monoshot 48, wherein it is converted to a gating pulse. Similarly inverter and square wave generator 52 provides a square wave to integrator 53 wherein it is converted to a saw tooth wave. The saw tooth is applied to comparator 54 together with the output of adder 51. The resultant pulse triggers monoshot 55. The pulses from monoshots 48 and 55 are applied to OR gate 56. The output of OR gate 56 is fed to pulse amplifier 57, wherein the pulses are fed to gate electrode 21.

Due to the constant current $I_{dc}$ through inductor 15, it is possible to employ a superconducting coil as inductor 15. As disclosed hereinabove, superconductivity is a phenomenon exhibited by certain materials at very low temperatures. The resistanceless substances can carry a constant current and have no heating or losses. The heating in a superconducting coil depends on the magnitude of the field variation, and the quality of superconductor in the coil. Since the circuit disclosed hereinabove provides very little current variation, herein is disclosed a superconducting coil for a 40 MVAR system having less than half the losses of conventional coils. If a 40 MVAR system is tied to a 13.8 kV line, the average current in the coil is 2,140 A and the peak to peak, 360 Hz voltage measured across the coil is 18.6 kV. Because of harmonic effects on ac systems, the variation in coil current can not be allowed to exceed about ±10%. The minimum coil inductance may be determined from the relation $$V = L \times \frac{d_i}{d_t}$$

to about 35 mH. The stored energy in the smallest possible coil that can be considered is 80 kJ. For convenience, a 100 kJ coil is considered hereinbelow.

The maximum losses of such a coil at 4 K. are less than 50 watts. The reactor coil disclosed is similar to a conventional inductor. A superconducting coil, in conjunction with a warm iron core and yoke forms a relatively small system. The volume of iron required depends on the total stored energy, the permeability and the applied field. At 225 Oe, the permeability of mild steel relative to a vacuum is about 70 and the stored energy is about 43 kJ/m$^3$ thus about 2.4 m$^3$ of iron will be required to store 100 kJ.

There must be an almost continuous, low reluctance path of ferro-magnetic material to channel the magnetic flux. Because such a small amount of iron is required, having the entire structure in a helium bath would simply the magnet design. However, ferro-magnetic materials exhibit hysteresis to a greater or lesser degree when they are subjected to an alternating magnetic field. For a steel that would used as a transformer core, the energy loss associated with a full cycle zero field to saturated negative field to saturated positive field and return to zero is typically 0.1 to 0.15 J/kg/cycle, which is sufficient to heat up a room-temperature sample by 3×10$^{-4}$° C. At 4 K., the specific heat of iron is about 300 times less than that at 300 K. Thus it will be seen that a full cycle would raise the temperature by 0.1 K. At a 360 Hz rate, and with each oscillation 1/10 of the full cycle, the temperature would increase 3 K. per second. This loss would make the refrigeration requirements of the coil with cold iron so large that the superconducting VAR control system would not be economically feasible. Therefore, a coil configuration with room-temperature iron is presented herein.

Figure 7:
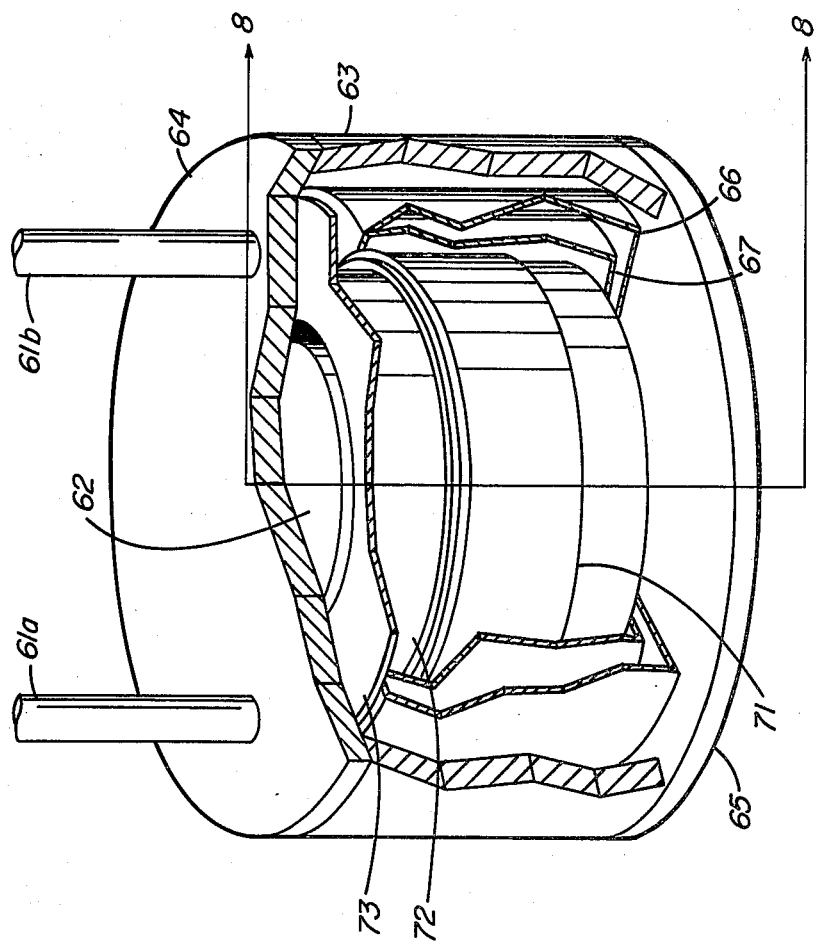
FIG. 7 is a cut-away drawing of the superconducting coil employed in connection with the asymmetrical Graetz bridge illustrated in FIGS. 1 and 4; and, FIG. 8 is a cross-sectional drawing of the superconducting coil of FIG. 7.
Figure 8:
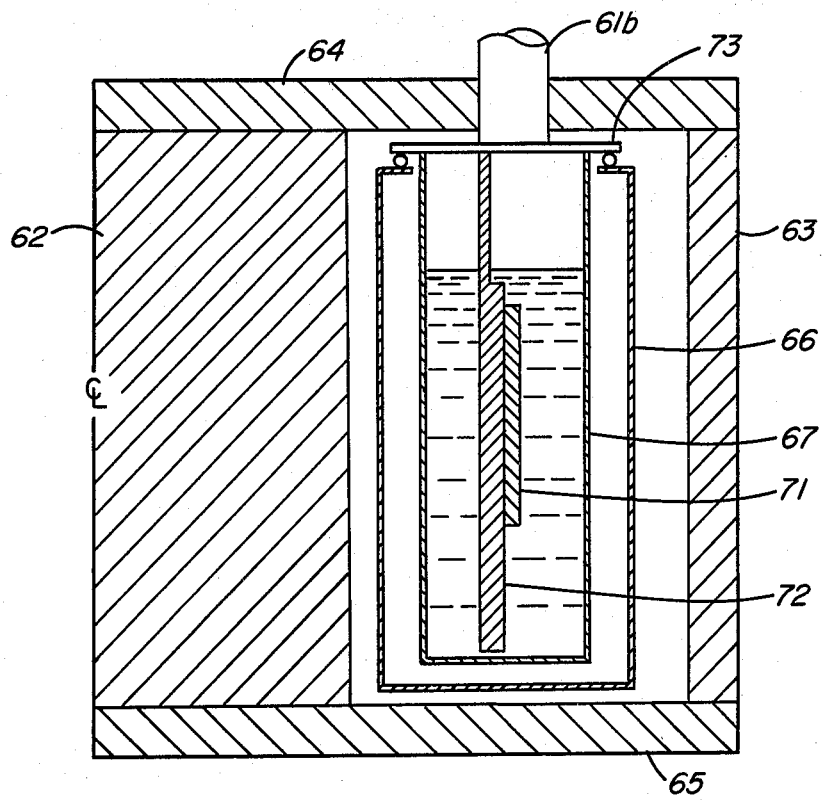

FIG. 7 is a cutaway drawing of the coil, and FIG. 8 is a cross-section taken along the line 8—8 of FIG. 7. The iron forming the core is cylindrically symmetric. The iron may be laminated to further reduce losses. A 0.5 m. diameter, 1 m. long central core 62 is provided, as is a 0.08 meter thick 1.1 m. outside diameter ring 63. Core 62 and ring 63 are connected by two 0.125 m. thick 1.1 m. outside diameter disks 64 and 65. The superconducting coil 71 is located in the annular space formed by these four pieces. The superconducting coil is about 0.8 meters long and 0.7 meters in diameter, having about 70 turns. The total volume of superconductor employed in coil 71 is only 150 cm$^3$.

Coil 71 is cooled by a liquid helium bath in a helium container 67 made of, exemplarily, epoxy fiber glass. Epoxy fiber glass is preferred since eddy currents would be induced in a metallic vessel and the heat produced would have to be removed from the 4 K. helium bath. A stainless steel vacuum vessel 66 encloses the helium bath, helium bath container 67, superconducting coil 71, and epoxy fiber glass coil form 72. The superconducting coil is connected to power leads 61a and 61b that bring the current to the coil in the liquid helium. These leads will vaporize and heat about six liters of helium each hour to room temperature. In addition, some radiation from room temperature will reach the 4 K. cryostat. There is a magnetic force between the warm iron and the cold coil. Since the system is symmetrical, this force will be balanced and, although the outward radial force at the center line of the coil may be large, there is no net force to displace the coil with respect to the iron. The radial force is resisted by the epoxy fiber glass form 72, upon which superconducting coil 71 is wound.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, a twelve-pulse asymmetrical Graetz bridge may be employed with a three phase circuit, in place of the six-pulse asymmetrical Graetz bridge illustrated hereinabove. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Static VAR control means comprising:
    a superconducting coil; and
    a single phase asymmetrical full wave Graetz bridge connected in parallel with said superconducting coil and adapted for connection to an ac power source, said Graetz bridge having first, second, third and fourth silicon controlled rectifiers connected in a bridge rectifier configuration having first and second opposing terminals adapted for connection to a single phase ac line;
    a gate electrode on each of said first, second, third, and fourth silicon controlled rectifiers;
    said superconducting coil connected to third and fourth opposing terminals on said bridge; and
    circuit means connected to said gate electrodes enabling conduction of said silicon controlled rectifiers whereby current flowing in said superconducting coil is constant, said circuit means including trigger pulse generating means and pulse delay means connected in circit with each of said gate electrodes, said trigger pulse generating means adapted for connection to a single phase ac line.

2. In the circuit means set forth in claim 1, said trigger pulse generating means connected to said first and second gate electrodes including:
   triangular wave generating means adapted for connection to said ac line;
   comparator means connected to said triangular wave generating means;
   monoshot means in circuit with said comparator means; and,
   pulse amplifying means.

3. In the circuit means set forth in claim 1, said trigger pulse generating means connected to said third and fourth gate electrodes including:
   inverter means adapted for connection to said ac line;
   triangular wave generating means connected to said inverter means;
   comparator means connected to said triangular wave generating means;
   monoshot means connected to said comparator;
   adder control means connected to an input of said comparator; and,
   pulse amplifying means connected to the output of said monoshot.

4. In the circuit means set forth in claim 1, first adjustable voltage means connected to first and third comparators, and second adjustable voltage means connected to second and forth comparators.

5. In a three phase power system, static VAR control means comprising:
   an asymmetrical three phase Graetz bridge having three phase terminals and two dc terminals;
   circuit means for controlling firing angles of said Graetz bridge, said circuit means including pulse generating means connected to said asymmetrical Graetz bridge for controlling said asymmetrical Graetz bridge, said pulse generating means including phase angle responsive means.

6. In the circuit means set forth in claim 5, said phase angle responsive means including direct voltage adding means and comparator means connected to said adding means and to phase voltage responsive wave shaping means.

7. In the circuit means set forth in claim 6, said phase voltage responsive wave shaping means including a square wave generator and an integrator to provide a triangular wave corresponding to said phase voltage.

* * * * *